(No Model.)

J. M. CLIFFORD.
LUMBER RULE.

No. 367,365. Patented Aug. 2, 1887.

Witnesses.
L. B. Fetherstonhaugh
J. M. Jackson

Inventor:
J. M. Clifford
by
Donald C. Ridout & Co
Attys

UNITED STATES PATENT OFFICE.

JOHN MILSTIN CLIFFORD, OF TORONTO, ONTARIO, CANADA, ASSIGNOR TO GEORGE REID, JR., AND JOHN B. REID, BOTH OF SAME PLACE.

LUMBER-RULE.

SPECIFICATION forming part of Letters Patent No. 367,365, dated August 2, 1887.

Application filed April 2, 1887. Serial No. 233,427. (No model.)

*To all whom it may concern:*

Be it known that I, JOHN MILSTIN CLIFFORD, of the city of Toronto, in the county of York, in the Province of Ontario, Canada, lumber inspector, have invented a certain new and useful Improvement in Lumber-Rules, of which the following is a specification.

The object of the invention is to provide means for readily measuring the thickness of a board without stooping; and it consists in the peculiar combination and the novel construction, arrangement, and adaptation of parts, all as more fully hereinafter described and claimed.

Figure 1:
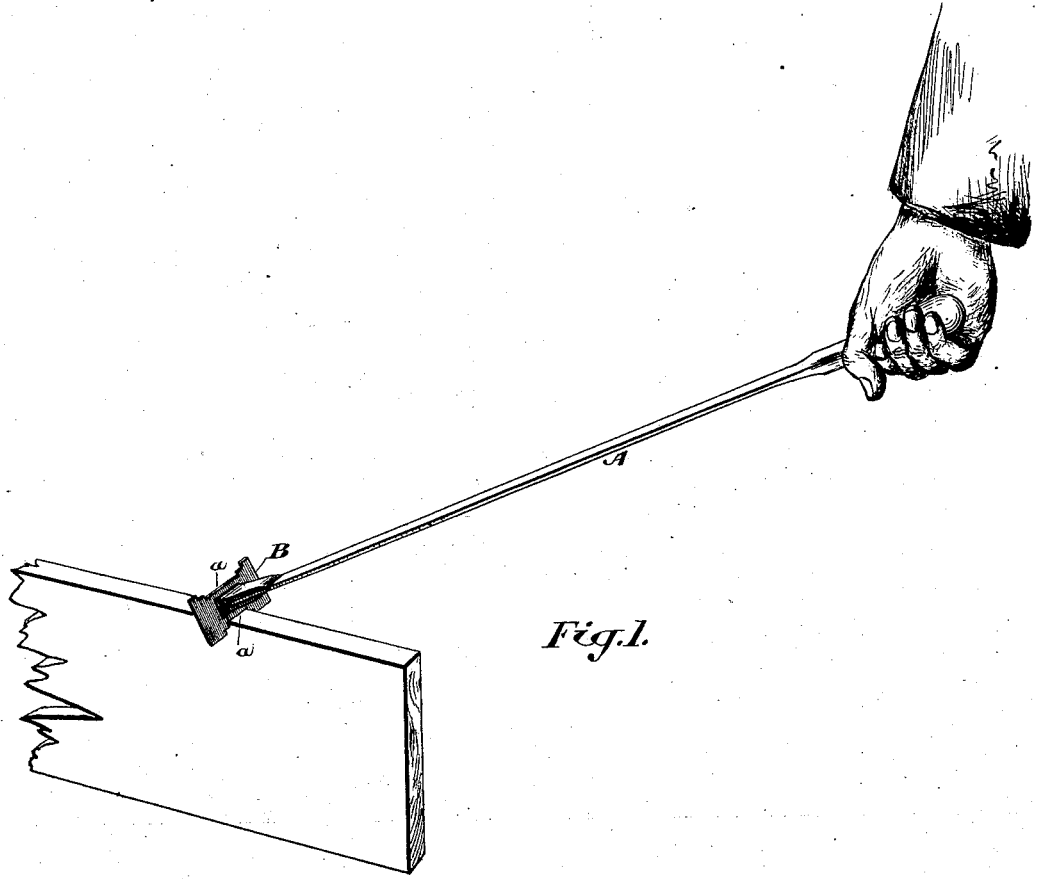
Figure 2:
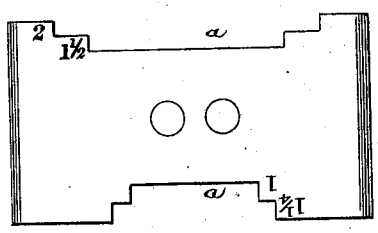

Figure 1 represents my improved rule in use. Fig. 2 is an end view of the head, showing the arrangement of my gages.

The invention is so extremely simple and yet effective that the drawings alone would be sufficient to convey the intention and operation of the invention.

A is an ordinary lumber-rule provided with the usual head, B; but in the head B, I form the gages marked *a*—for instance, one gage to measure the thickness of inch boards, another gage to measure inch-and-a-quarter boards, another for inch and-a-half, and another for two-inch boards, and so on, any thicknesses desired.

As shown by Fig. 1, the thicknesses of the boards can be measured by my improved lumber-rule without the necessity of the inspector or other party using the rule stooping, as is now necessary.

I deem it important that the head be attached to the rule, as shown, and that the edges of said head parallel with the sides of said rule be provided with the gages *a*, for by this construction the person using the device can measure both the length and width of a board without stooping and without changing his position.

What I claim as my invention is—

The improved lumber-rule herein described, consisting of the head B, formed upon its top and bottom edges with gages *a* of varying sizes, as shown, and the lumber-rule A, secured at one end to one face of said head B, substantially as and for the purpose specified.

Toronto, March 23, 1887.

JOHN MILSTIN CLIFFORD.

In presence of—
GEO. REID,
E. COATSWORTH, Jr.